Aug. 3, 1954 — T. J. PITMAN — 2,685,327
ADJUSTABLE VEHICLE SEAT BACK
Filed Aug. 27, 1952
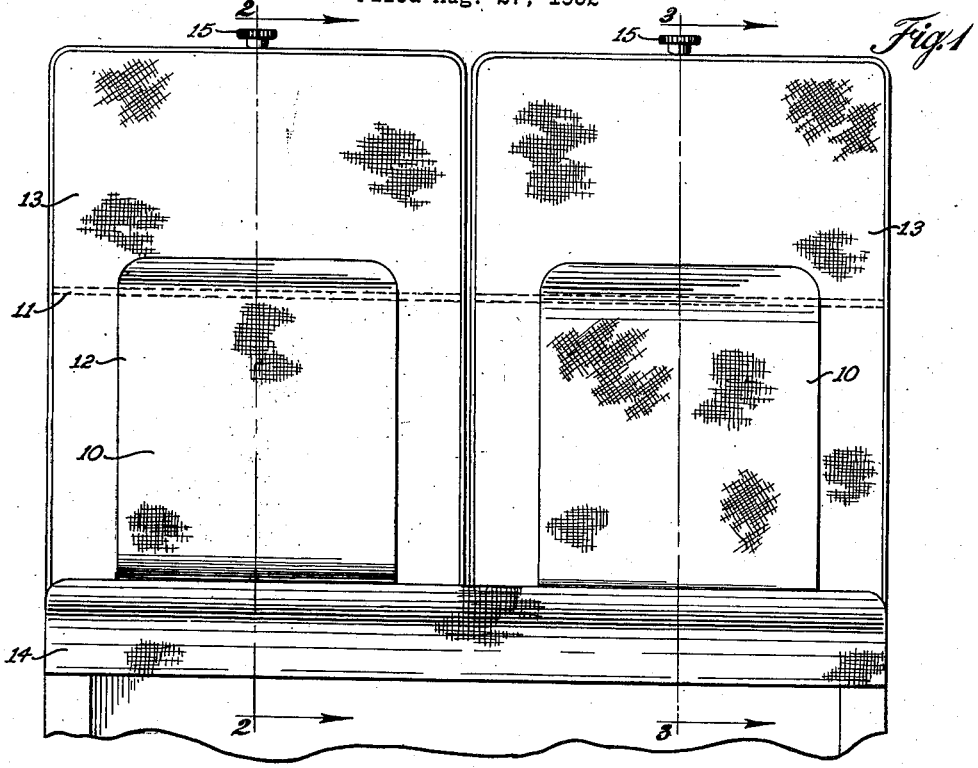
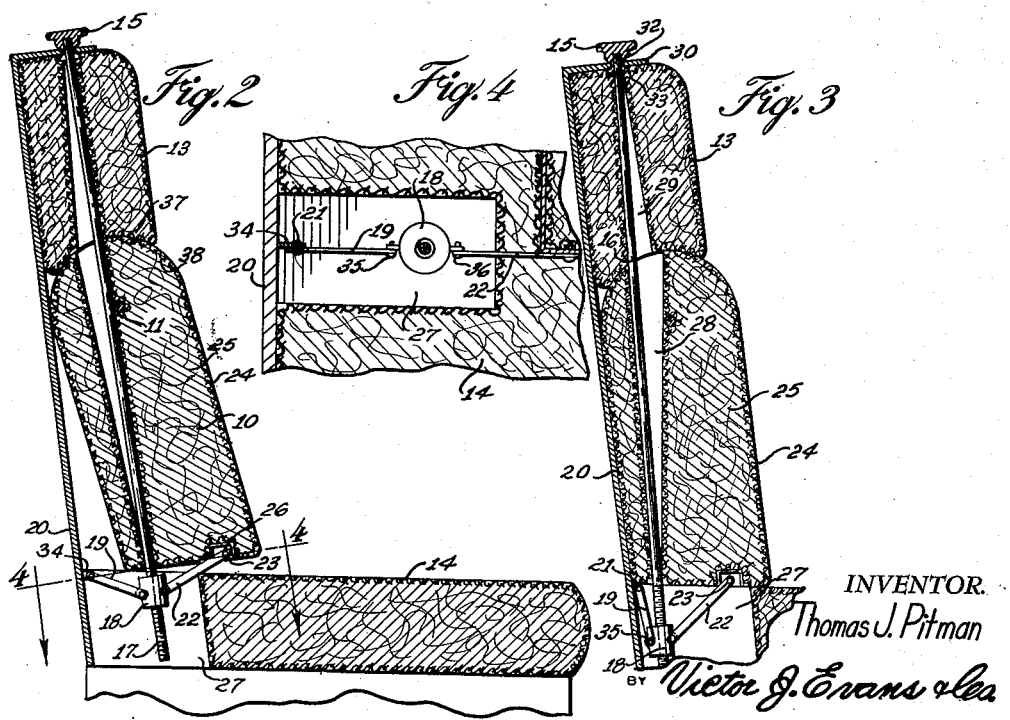
INVENTOR.
Thomas J. Pitman
BY Victor J. Evans & Co.
ATTORNEYS Patented Aug. 3, 1954

2,685,327

UNITED STATES PATENT OFFICE 2,685,327

ADJUSTABLE VEHICLE SEAT BACK

Thomas J. Pitman, Dewey, Okla.

Application August 27, 1952, Serial No. 306,545

2 Claims. (Cl. 155—158)

1

This invention relates to adjustable backs for seats of motor vehicles and particularly pleasure cars, and in particular a back for a seat in which a section in the lower part of the center of the back is pivotally mounted and provided with means whereby the lower end is moved outwardly to change the position of the back.

The purpose of this invention is to provide means for adjusting the position of the back of a seat to relieve fatigue particularly in driving long distances.

Various devices have been provided for adjusting positions of motor vehicle seats and in some instances the back of the seat is pivotally mounted on the seat. However, to relieve fatigue resulting particularly from driving long distances it is necessary to break the back at a point intermediate of the height thereof so that the angle between the lower portion and upper portion may be changed. With this thought in mind this invention contemplates a vehicle seat having a back with an insert in the intermediate portion and lower part of the back pivotally mounted at the upper end and adapted to swing outwardly about the pivot whereby the angle between the lower and upper portions of the back is readily adjustable.

The object of this invention is, therefore, to provide means for pivotally mounting an insert or section of a back of a seat whereby the angle of the lower section of the back is adjustable in relation to the upper section.

Another object of the invention is to provide means for adjusting the angle between the lower section of the back of a seat and the upper section in which the position of the lower section may be adjusted by the driver of a motor vehicle while the vehicle is in operation.

Another object of the invention is to provide a seat back having an adjustable section therein in which the back is adapted to be used in place of the back now in position on a seat.

A further object of the invention is to provide a motor vehicle seat having a back with an adjustable section incorporated in the back in which the back is of a simple and economical construction.

With these and other objects and advantages in view the invention embodies a back for a seat in which the back is provided with an opening in the lower part and in the center thereof and in which an insert nested in the opening is readily adjustable by toggle acting arms actuated by a thumb nut on the upper end of the back of the seat.

2

Other features and advantages of the invention will appear from the following description taken in connection with the drawing, wherein:

Figure 1 is a front elevational view showing a motor vehicle seat having adjustable inserts or sections in the lower parts of sections of the back thereof.

Figure 2 is a cross section taken on line 2—2 of Fig. 1 showing the improved back with the adjustable section in the lower part thereof extended.

Figure 3 is a section taken on line 3—3 of Fig. 1 showing the section in the lower part of the back nested in the opening of the back.

Figure 4 is a sectional plan taken on line 4—4 of Fig. 2 illustrating the toggle acting levers for adjusting the positions of the adjustable section of the back.

Referring now to the drawing wherein like reference characters denote corresponding parts the improved adjustable motor vehicle seat back of this invention includes a section 10 of a back of a motor vehicle seat pivotally mounted by a pin 11 in a rectangular shaped recess 12 in a back 13 of a seat 14 and, as illustrated in Figs. 2 and 3 the position of the section 10 is adjusted by a thumb nut 15 on the upper end of a rod 16, the lower threaded end 17 of the rod being threaded in a collar 18 which is pivotally mounted by a lever 19 on a support 20 at the back of the seat by a pin 21 and that is connected to the section 10 of the back of the seat with an arm 22 that is pivotally connected to the section 10 with a pin 23.

The lower section 10 of the back of the seat is formed with a fabric cover 24 having conventional filling material as indicated by the numeral 25 therein and the lower end is provided with a recess 26 in which the arm 22 is pivotally mounted by the pin 23.

The seat 14 and back 13 are also formed of conventional materials.

As illustrated in Fig. 4 the seat 14 is provided with a recess 27 in which the collar 18 is positioned, and the lever 19 and arm 22 also extend into the recess 27 when the section 10 of the back is collapsed or adjusted to a straight position, as shown in Fig. 3.

The section 10 of the back is provided with a V-shaped recess 28 and a similar recess 29, the position of which is reversed, is provided in the upper portion of the back 13.

The upper end of the rod 16 is held in a flange 30 of the support 20 and the thumb nut 15, which is secured to the upper end of the rod 16 by a pin 32, is journaled by a collar 33 in the flange 30.

The support 20 extends upwardly from the base of the seat and, as illustrated in Fig. 4, the lever 19 is pivotally mounted by the pin 21 on a lug 34 that extends from the support 20.

The lever 19 is pivotally connected to the collar 18 with a pin 35 and the arm 22 is pivotally connected to the opposite side of the collar with a pin 36.

It will be understood that the seat back 13 and the section 10 may be formed of other suitable designs and in the design shown the lower part of the back 13 is provided with an arcuate recess 37 in which the arcuate upper end 38 of the movable section 10 is nested, as shown in Figs. 2 and 3.

With the parts arranged in this manner the position of the inserts or sections 10 in the lower parts of the seat backs may readily be adjusted by the nuts 15 at the upper ends of the rods 16 so that instead of resting the back against a straight surface, the surface may be angularly adjusted in the center whereby the lower part may be extended forwardly or may be moved to a straight position.

It will be understood that modifications, within the scope of the appended claims, may be made in the design and arrangement of the parts without departing from the spirit of the invention.

What is claimed is:

1. In a seat, the combination which comprises a horizontally disposed seat portion having a recess at the rear edge thereof, a substantially vertically disposed support having a recess in the lower part thereof extended upwardly from the rear of said horizontally disposed seat portion, a movable back section positioned in the recess of the vertically disposed support, means pivotally mounting the movable back section in the vertically disposed support, a rod having a thumb nut on the upper end extended through the vertically disposed support and movable back section and having a threaded lower end, a collar threaded on the said threaded lower end of the rod, a lever pivotally connecting said collar to the vertically disposed support of the seat, and an arm pivotally connecting the collar to the movable back section of the vertically disposed support of the seat whereby downward movement of the collar draws the forward surface of said movable back section into a plane parallel with said vertically disposed support and upward movement of the collar extends the lower end of said movable section.

2. In a seat, the combination which comprises a horizontally disposed seat portion having a recess at the rear edge thereof, a substantially vertically disposed support having a fixed back section in the upper part and a recess in the lower part intermediate the fixed back section and the horizontally disposed seat portion and extended upwardly from the rear of said horizontally disposed seat portion, a movable back section positioned in the recess of the vertically disposed support, means pivotally mounting the movable back section in the vertically disposed support, a rod having a thumb nut on the upper end extended through the fixed back section of the vertically disposed support and movable back section and having a threaded lower end, a collar threaded on the said threaded lower end of the rod, a lever pivotally connecting said collar to the vertically disposed support of the seat, and an arm pivotally connecting the collar to the movable back section of the vertically disposed support of the seat whereby downward movement of the collar draws the forward surface of said movable back section into a plane parallel with said vertically disposed support and upward movement of the collar extends the lower end of said movable back section, and the fixed back portion of said vertically disposed support and the movable back section of the seat having V-shaped recesses therein through which said rod extends.

References Cited in the file of this patent

UNITED STATES PATENTS

| Number | Name | Date |
|---|---|---|
| 233,140 | Candrian | Oct. 12, 1880 |
| 305,845 | Poolman et al. | Sept. 30, 1884 |
| 711,412 | Archambeault | Oct. 14, 1902 |
| 1,580,606 | Jones | Apr. 13, 1926 |
| 1,743,377 | Nadell | Jan. 14, 1930 |

FOREIGN PATENTS

| Number | Country | Date |
|---|---|---|
| 12,447 | Great Britain | May 28, 1903 |